Figure 1:
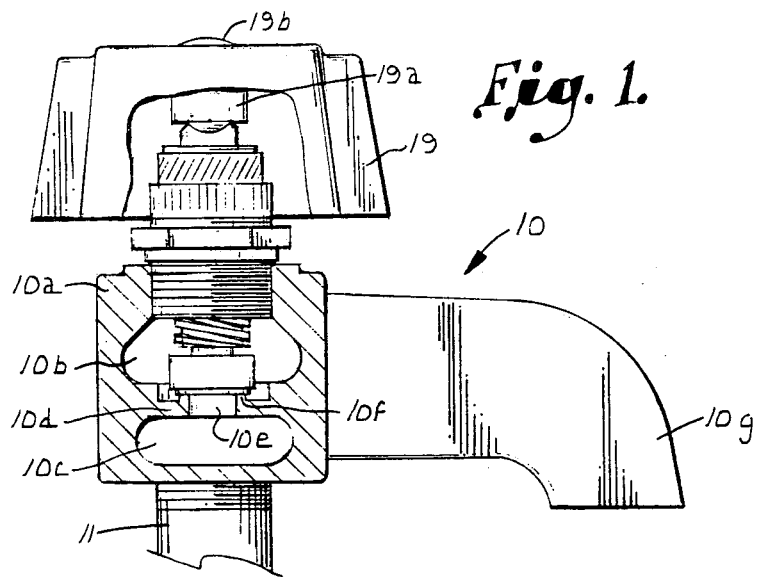

United States Patent [19]

Bartlett

[11] 4,363,466

[45] Dec. 14, 1982

[54] REPLACEMENT VALVE ASSEMBLY

[76] Inventor: Joseph E. Bartlett, 215 S. Parker (Hwy. 7), Olathe, Kans. 66601

[21] Appl. No.: 234,943

[22] Filed: Feb. 17, 1981

[51] Int. Cl.³ .................... F16K 31/44; F16K 25/00
[52] U.S. Cl. .................................. 251/357; 251/86; 251/214; 137/315
[58] Field of Search ............. 251/357, 366, 367, 216, 251/223, 225, 214, 86, 88; 137/454.5, 329.01, 315

[56] References Cited

U.S. PATENT DOCUMENTS

| 1,846,624 | 2/1932 | Volk et al. | 251/357 |
| 2,352,249 | 6/1944 | Briggs, Jr. | 251/357 |
| 3,137,476 | 6/1964 | Rotheraine et al. | 251/357 |
| 3,385,560 | 5/1968 | Hare | 251/88 |
| 3,700,207 | 10/1972 | Bartlett | 251/368 |

FOREIGN PATENT DOCUMENTS

| 2140975 | 10/1972 | Fed. Rep. of Germany | 251/214 |
| 1099106 | 8/1955 | France | 251/223 |
| 1285428 | 1/1962 | France | 251/223 |
| 6312 | of 1891 | United Kingdom | 251/223 |

Primary Examiner—A. Michael Chambers
Attorney, Agent, or Firm—Kokjer, Kircher, Bradley, Wharton, Bowman & Johnson

[57] ABSTRACT

A replacement valve assembly with an adjustable sleeve fitting received in the valve port of a conventional faucet body and sealed by a locking nut and gasket. A valve stem is disposed centrally through the fitting and carries a frictionless washer retainer to bias a washer to the valve seat and to freely swivel on the valve stem to reduce wear. An adjustable bushing with an associated jam nut biases a sealing gasket to the valve stem.

4 Claims, 2 Drawing Figures

U.S. Patent  Dec. 14, 1982  4,363,466

REPLACEMENT VALVE ASSEMBLY

This invention relates to a replacement valve assembly for conventional faucet structures. More particularly, the invention relates to an improved replacement assembly which has features of construction rendering it more universally applicable to faucets of various manufacturers than has been possible in the past while providing improved operational and maintenance features.

It has long been recognized as desirable to provide a replacement for the operative parts of a conventional faucet without requiring removal of the faucet body from the pipe which it serves. Furthermore, there has long been a need to provide a replacement valve assembly which is reliable in operation and facilitates routine maintenance by those having little or no skill in the plumbing arts. The principal goal of this invention is to meet these needs.

More particularly, an objective of this invention is to provide a durable replacement assembly which is readily adaptable to the faucets of various manufacturers. Among the manufacturers of faucet assemblies, there is a wide range of critical dimensions thread sizes and parts. One faced with the problem of replacing such a valve assembly, is confronted with the often times perplexing task of selecting the proper stem assembly from numerous possibilities. Accordingly, an objective of this invention is to provide a replacement valve assembly which greatly reduces the complexity of the selection process and which provides a wide range of adjustment in the components of the replacement assembly to render it adaptable to a wide variety of configurations and sizes.

Another objective of the invention is to provide a replacement valve assembly which may be easily and positively adjusted to compensate for wear on the parts over time.

Yet another object of the invention is to provide a replacement valve assembly having a prolonged life and which is virtually leak proof during service.

An additional object of the invention is to provide a replacement valve assembly which greatly facilitates routine maintenance of the assembly. This goal is achieved by providing replaceable packing gaskets to seal potential sources of valve leakage at the interfaces of the various adjustable components of the assembly.

A further object of the invention is to provide a friction-free faucet washer retainer which is extremely serviceable but, when necessary, may be quickly and inexpensively replaced as a unit or, alternatively, may be repaired by simple replacement of the washer itself.

Other and further objects of the invention, together with the features of novelty appurtenant thereto will appear in the course of the following description.

Figure 2:
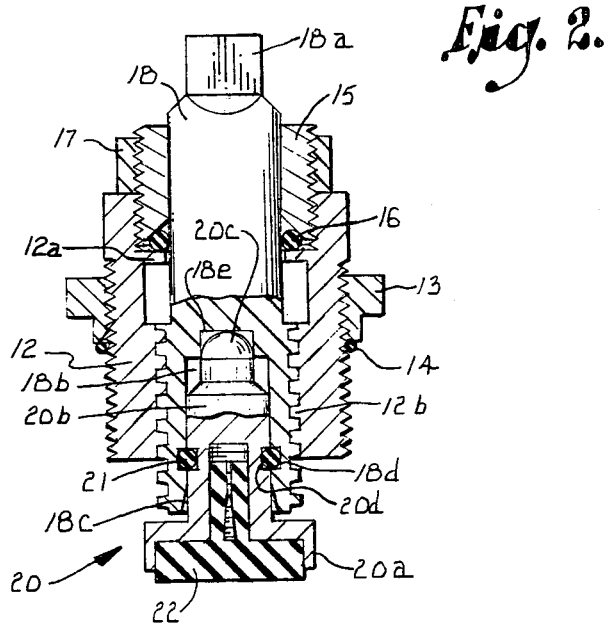

In the accompanying drawings, in which like reference numerals indicate like parts in the various views, and which are to be read in conjunction with the specification:

FIG. 1 is a side sectional view of a replacement valve assembly embodying the invention and shown installed in a typical faucet body; and FIG. 2 is an enlarged side sectional view of the replacement valve assembly.

Referring more particularly to the drawings, FIG. 1 shows a typical faucet, generally designated by the numeral 10.

Interiorly of the valve body 10a are chambers 10b and 10c separated by a partition 10d. A circular opening 10e through the partition 10d provides communication between chambers 10b and 10c. The upper portion of the partition 10d adjacent the bore 10e forms an annular valve seat 10f. Chamber 10b communicates with spigot 10g integrally formed with the valve body 10a for discharge of liquid when the valve is opened. As is known, the faucet body 10a is connected to a pipe 11 leading to a liquid source, typically water. The upper portion of the valve body 10a is threaded internally to receive a valve assembly.

With reference to FIG. 2, attention is directed to the replacement valve assembly as contemplated by the present invention.

The replacement valve assembly includes an elongated sleeve 12 threaded exteriorly to be received in the threaded valve port of valve body 10a. Sleeve 12 is of sufficient length to threadably penetrate the valve body 10a as necessitated by the dimensional configuration of the faucet 10. A locking nut 13 is threadably received on the sleeve 12 to bias a compression gasket 14 against the upper surface of the valve body 10a thereby locking the sleeve 12 to the valve body 10a and sealing the connection therebetween.

The upper end of sleeve 12 is threaded interiorly to an annular shoulder 12a to receive an exteriorly threaded packing nut 15. The packing nut 15 has a central axial bore with an interior chamfer on the lower end thereof. A packing gasket 16 is captured between the annular shoulder 12a and the chamfer of packing nut 15. An internally threaded jam nut 17 is threadably received on the exposed portion of packing nut 15 and is snuggly biased against sleeve 12 to lock the adjustable relationship between packing nut 15 and sleeve 12.

In the lower internal portion of sleeve 12 are provided gross (e.g. Acme) threads 12b which threadably receive a valve stem 18. The threads 12b are right handed. The upper end of the valve stem 18 forms a square post 18a adapted to receive the socket 19a of a radially uniform faucet handle 19 as shown in FIG. 1. The end of the post 18a is threadably bored to receive a retaining screw 19b which holds the handle 19 in place.

In the lower end of valve stem 18 is an axial bore 18b. The lowermost edge of this recess is slightly tapered as indicated by numeral 18c. Above the taper 18c is an annular groove 18d recessed in the interior surface of the bore 18b. In the upper, innermost end of bore 18b is a centrally aligned recess 18e of smaller diameter than the bore 18b.

Disposed within the bore 18b of the valve stem 18 is a washer retaining assembly 20. The washer retaining assembly 20 includes a washer cup 20a integrally formed with a shank 20b which penetrates the bore 18b of the valve stem 18. The upper end of the shank 20b is formed as a hemisphere 20c which is received in the recess 18e. A recess 20d in the shank 20b registers with the annular groove 18d when the washer retaining assembly 20 is inserted in the end of the valve stem 18. An O-ring 21 is received in the annular space formed by the grooves 18d and 20d to hold the washer retaining assembly 20 in the end of the valve stem 18.

A washer 22 is removably secured in the cup portion 20a. Washer 20 is preferably fabricated from thermoplastic urethane polymer in accordance with the teachings of my U.S. Pat. No. 3,700,207, entitled "Washer Replacement Assembly for Faucet Valves", issued Oct. 24, 1972 and incorporated herein by reference. The washer 22 includes a disk like main body having an integrally bifurcated shank which penetrates the threaded central bore 20e of the washer retainer 20.

Alternatively, the washer itself may be a conventional bib washer inserted in the cup portion 20a and secured thereto by a screw received in the central bore 20e.

The valve stem is so configured such that when assembled in the sleeve 12, the distance between the annular shoulder 12a of sleeve 12 and the upper end of the gross threads on the valve stem 18 is always less than the distance between the back surface (upper face) of the cup portion 20a and the lower surface of the sleeve 12. In other words, when the valve stem 18 is rotated counterclockwise to raise the valve stem in relation to sleeve 12, the threads on the valve stem 18 will engage and thus be stopped by the annular shoulder 12a before the surface of the cup 20a engages the lower face of sleeve 12. Thus, the washer retainer will not be unintentionally dislodged from the valve stem 18 when the valve stem is rotated counterclockwise to its limit position.

So constructed, the valve assembly is particularly suitable as a replacement assembly for a wide variety of faucets of various manufacturers. The sleeve 12 which penetrates the valve port of a conventional faucet body may be adjustably varied to postion the washer 22 at an appropriate location to engage and disengage the valve seat 10f when the stem 18 is rotated. The locking nut 13 together with the gasket 14 secures the sleeve 12 and seals in a leakproof manner the interface between the faucet body 10a and sleeve 12.

Similarly, packing gasket 16 captured between packing nut 15 and annular shoulder 12a of the sleeve 12 provides a leakproof seal against the stem 18. Jam nut 17 secures the position of packing nut 15 in spite of extended opening and closing of the faucet. With the valve stem rotated such that the washer 22 engages the valve seat 10f to prevent flow through the faucet, jam nut 17 and packing nut 15 may be removed when replacement of the packing gasket 16 is required.

The washer retainer 20 provides a friction-free nonabrasive closure which is likewise fully serviceable. To replace the retainer, the fluid source is shut off first. The locking nut 13 is backed off and the sleeve 12 is removed from the faucet body. The washer retainer 20 can then be replaced as a unit simply by removing it from the stem 18 and inserting a replacement retainer. Alternatively, it may be necessary only to replace the washer itself which can be easily removed from the retaining cup 20a.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the drawings is to be interpreted as illustrative and not in a limiting sense.

Having thus described the invention, I claim:

1. A replacement valve assembly for a faucet body having an internally threaded valve port, said replacement assembly comprising:

a sleeve member threadably received by said valve port to adjustably penetrate the faucet body, said sleeve member having first and second threaded interior bores separated by an annual interior shoulder;

a gasket encircling said sleeve member;

a lock nut carried on said sleeve member to urge said gasket to engagement with the faucet body and to lock the position of said sleeve with respect to the faucet body;

a valve stem disposed centrally through said sleeve member and threadably received by said first threaded interior bore, said stem having upper and lower ends and said lower end having an axial bore therein;

a washer retaining member having a shank portion received by said axial bore of the valve stem and a cup portion joined to said shank portion, said shank portion of the washer retaining member having an integrally formed hemisphere on the upper end thereof and said axial bore having a central recess in the upper end thereof to receive said hemisphere to provide a friction-free pivot of said washer retaining member with said valve stem, said cup portion of said washer retaining member so positioned such that the distance between said interior shoulder of said sleeve member and the threads of the valve stem is less than the distance between said sleeve member and said cup portion;

an O-ring retainer holding the shank portion of said washer retaining member within said axial bore of the valve stem;

a valve closure washer removably secured to the washer retaining member within said cup portion;

an exteriorly threaded packing nut encircling said valve stem and received by said second threaded interior bore of said sleeve member, a jam nut carried on said packing nut to lock the position of said packing nut with respect to said sleeve member; and a packing gasket encircling said valve stem and urged to sealing engagement with said valve stem and said interior shoulder of said sleeve member by said packing nut, to provide a leak-proof seal.

2. The replacement valve assembly as in claim 1, the upper end of said valve stem receiving a radially uniform faucet handle and said valve stem having right hand threads to permit replacement of both right or left hand thread valves.

3. The replacement valve assembly as in claim 2, said upper end of said valve stem formed as a generally square head adapted to receive said faucet handle.

4. The replacement valve assembly as in claim 1, said washer fabricated from a thermoplastic urethane polymer.

* * * * *